(12) United States Patent
Wang

(10) Patent No.: US 12,552,386 B2
(45) Date of Patent: Feb. 17, 2026

(54) METHOD FOR CONTROLLING AUTONOMOUS VEHICLE, AND AUTONOMOUS VEHICLE

(71) Applicant: Volvo Car Corporation, Gothenburg (SE)

(72) Inventor: Wei Wang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 387 days.

(21) Appl. No.: 17/731,340

(22) Filed: Apr. 28, 2022

(65) Prior Publication Data

US 2022/0348204 A1 Nov. 3, 2022

(30) Foreign Application Priority Data

Apr. 29, 2021 (CN) .......................... 202110472642.1

(51) Int. Cl.
*B60W 30/182* (2020.01)
*B60K 35/10* (2024.01)
(Continued)

(52) U.S. Cl.
CPC ........... *B60W 30/182* (2013.01); *B60K 35/10* (2024.01); *B60K 35/28* (2024.01); *B60K 35/65* (2024.01);
(Continued)

(58) Field of Classification Search
CPC ............ G01C 21/3492; G01C 21/3484; G01C 21/3617; B60W 60/001; B60W 60/0015;
(Continued)

(56) References Cited

U.S. PATENT DOCUMENTS 9,517,771 B2 * 12/2016 Attard ............. B60W 30/18163
9,818,240 B1 * 11/2017 Brenner ................. G07C 5/008
(Continued)

FOREIGN PATENT DOCUMENTS

CN 107702729 A * 2/2018
CN 112298184 A * 2/2021 .......... B60W 30/182
(Continued)

OTHER PUBLICATIONS

CN-107702729-A machine translation (Year: 2018).*
(Continued)

*Primary Examiner* — Fadey S. Jabr
*Assistant Examiner* — Mark Robert Heim
(74) *Attorney, Agent, or Firm* — Clements Bernard Walker; Christopher L. Bernard

(57) ABSTRACT

A method for controlling an autonomous vehicle including: obtaining trip information of a current trip of a user of the autonomous vehicle and historical traffic information related to the current trip; selecting an autonomous driving (AD) mode that is suitable for the current trip from a plurality of pre-defined AD modes; comparing time required for the autonomous vehicle to complete a portion of the current trip in the selected AD mode with historical average time to complete the portion of the current trip, the historical average time being acquired based on the historical traffic information; and dynamically adjusting driving of the autonomous vehicle based on the comparison to minimize the difference between the time required for the autonomous vehicle to complete the portion of the current trip in the selected AD mode and the historical average time.

17 Claims, 5 Drawing Sheets

(51) Int. Cl.
*B60K 35/28* (2024.01)
*B60K 35/65* (2024.01)
*B60W 30/18* (2012.01)
*B60W 50/14* (2020.01)
*B60W 60/00* (2020.01)
*B60K 35/29* (2024.01)
*B60K 35/60* (2024.01)

(52) U.S. Cl.
CPC ...... *B60W 30/18163* (2013.01); *B60W 50/14* (2013.01); *B60W 60/0013* (2020.02); *B60W 60/0015* (2020.02); *B60W 60/0021* (2020.02); *B60K 35/29* (2024.01); *B60K 35/60* (2024.01); *B60K 2360/166* (2024.01); *B60K 2360/172* (2024.01); *B60K 2360/175* (2024.01); *B60K 2360/1868* (2024.01); *B60K 2360/1876* (2024.01); *B60W 2050/146* (2013.01); *B60W 2520/105* (2013.01); *B60W 2540/221* (2020.02); *B60W 2554/406* (2020.02); *B60W 2555/60* (2020.02); *B60W 2556/10* (2020.02)

(58) Field of Classification Search
CPC ............. B60W 50/082; B60W 30/182; B60W 30/18163; B60W 2540/221; B60W 2050/146; B60W 2520/105; B60W 2556/10; B60W 60/0021; B60W 60/0013; B60W 50/14; B60W 2554/406; B60W 2555/60; B60W 20/12; B60L 2260/42; B60K 35/00; B60K 35/28; B60K 35/29; B60K 2360/166; B60K 2360/172; B60K 2360/175; B60K 2360/1876; B60K 2360/1868; B60K 35/60; B60K 35/10; B60K 35/65; G08G 1/0129; G05D 1/0217; G05D 1/651; G05D 1/644
See application file for complete search history.

(56) References Cited

U.S. PATENT DOCUMENTS

| | | | | |
|---|---|---|---|---|
| 9,932,033 | B2* | 4/2018 | Slusar | B60W 30/09 |
| 10,107,635 | B2* | 10/2018 | Larner | B60W 60/0013 |
| 10,685,248 | B1* | 6/2020 | Sanandaji | G06F 18/23213 |
| 10,689,033 | B2* | 6/2020 | Mizoguchi | B60W 30/18163 |
| 11,143,522 | B2* | 10/2021 | Wang | G01C 21/3697 |
| 12,013,695 | B1* | 6/2024 | Fields | G05D 1/0088 |
| 2012/0109411 | A1* | 5/2012 | Tokimasa | B60W 10/184 701/1 |
| 2012/0253647 | A1* | 10/2012 | Srinivasan | G08G 1/0112 701/117 |
| 2013/0226431 | A1* | 8/2013 | Lu | B60W 50/0098 701/96 |
| 2016/0009291 | A1* | 1/2016 | Pallett | G05D 1/0217 701/23 |
| 2018/0088572 | A1* | 3/2018 | Uchida | B60W 30/16 |
| 2018/0304901 | A1* | 10/2018 | Duan | B60W 40/08 |
| 2018/0365996 | A1* | 12/2018 | Profendiner | G08G 1/0112 |
| 2019/0061761 | A1* | 2/2019 | Tsuchiya | B60W 60/0015 |
| 2019/0235510 | A1* | 8/2019 | Hashimoto | B60W 50/082 |
| 2019/0265060 | A1* | 8/2019 | Han | G01C 21/3492 |
| 2019/0331502 | A1* | 10/2019 | Fowe | G01C 21/3446 |
| 2020/0182636 | A1* | 6/2020 | Ningthoujam | G08G 1/096725 |
| 2020/0290619 | A1* | 9/2020 | Mehdi | B60W 40/04 |
| 2020/0361452 | A1* | 11/2020 | McGill | B60W 50/045 |
| 2021/0016779 | A1* | 1/2021 | Gillet | B60W 40/04 |
| 2021/0031768 | A1* | 2/2021 | Yano | B60W 10/188 |
| 2021/0046924 | A1* | 2/2021 | Caldwell | G08G 1/166 |
| 2021/0046936 | A1* | 2/2021 | Umeda | B60W 10/20 |
| 2021/0080263 | A1* | 3/2021 | Zhu | G01C 21/165 |
| 2021/0129847 | A1* | 5/2021 | Grubwinkler | G01C 21/3691 |
| 2021/0171066 | A1* | 6/2021 | Koehler | B60W 60/0025 |
| 2021/0188275 | A1* | 6/2021 | Matsumura | B60W 60/0053 |
| 2021/0188317 | A1* | 6/2021 | Xia | B60W 60/0015 |
| 2021/0239484 | A1* | 8/2021 | Holder | B60W 40/10 |
| 2021/0300372 | A1* | 9/2021 | Tsai | B60W 30/0956 |
| 2022/0003310 | A1* | 1/2022 | Vroemen | F16H 61/12 |
| 2022/0144276 | A1* | 5/2022 | Parks | B60W 30/18163 |
| 2022/0171398 | A1* | 6/2022 | Grossman | B60W 50/14 |
| 2022/0214176 | A1* | 7/2022 | Kim | G08G 1/096775 |
| 2022/0219726 | A1* | 7/2022 | Yadmellat | B60W 60/0011 |
| 2022/0258715 | A1* | 8/2022 | Shigyo | B60W 50/0097 |
| 2022/0306100 | A1* | 9/2022 | Larsson | B60W 60/0015 |
| 2022/0348233 | A1* | 11/2022 | Hukkeri | B60W 30/181 |
| 2023/0041319 | A1* | 2/2023 | You | G08G 1/096791 |
| 2023/0168095 | A1* | 6/2023 | Lee | G01C 21/3415 |
| 2023/0234613 | A1* | 7/2023 | Whiteside | B60W 50/045 701/23 |
| 2023/0280175 | A1* | 9/2023 | Gibson | B60W 50/14 701/25 |
| 2024/0140422 | A1* | 5/2024 | Lyngfelt | B60W 30/16 |
| 2024/0371216 | A1* | 11/2024 | Gaudin | G07C 5/008 |

FOREIGN PATENT DOCUMENTS

| | | | | |
|---|---|---|---|---|
| DE | 102018111266 A1 * | 11/2018 | | B60W 30/025 |
| DE | 102018216042 A1 * | 3/2020 | | |
| GB | 2586490 A * | 2/2021 | | B60W 30/182 |
| JP | 6331858 B2 * | 5/2018 | | |
| TW | 202141445 A * | 11/2021 | | G08G 1/096725 |
| WO | WO-2021168058 A1 * | 8/2021 | | B60W 50/0097 |

OTHER PUBLICATIONS

CN-112298184-A machine translation (Year: 2021).*
DE-102018111266-A1 machine translation (Year: 2018).*
DE-102018216042-A1 machine translation (Year: 2020).*
TW-202141445-A (Year: 2021).*
DE 102018216042 machine translation (Year: 2018).*
JP-6331858-B2 machine translation (Year: 2018).*

* cited by examiner

METHOD FOR CONTROLLING AUTONOMOUS VEHICLE, AND AUTONOMOUS VEHICLE

CROSS-REFERENCE TO RELATED APPLICATION

The present disclosure claims the benefit of priority of co-pending Chinese Patent Application No. 202110472642.1, filed on Apr. 29, 2021, and entitled "Control System, Unit and Method for AD Vehicle," the contents of which are incorporated in full by reference herein.

TECHNICAL FIELD

The present disclosure relates to a control solution for an autonomous vehicle.

BACKGROUND

In recent years, autonomous vehicles have attracted more and more attention. In the prior art, research on autonomous driving has mainly focused on safety-related control technologies such as blind spot monitoring, lane departure warning, and collision prediction. Prior art autonomous driving solutions can achieve safe delivery of users, but it applies the same control logic, thus the same autonomous driving style to all different driving scenes. But different people have different needs and expectations for autonomous driving. The prior art solutions fail to adapt to such different needs and expectations.

SUMMARY

According to an embodiment of the disclosure, there is provided a method for controlling an autonomous vehicle. The method includes: obtaining trip information of a current trip of a user of the autonomous vehicle and historical traffic information related to the current trip; selecting an autonomous driving (AD) mode that is suitable for the current trip from a plurality of pre-defined AD modes; comparing time required for the autonomous vehicle to complete a portion of the current trip in the selected AD mode with historical average time to complete the portion of the current trip, the historical average time being acquired based on the historical traffic information; and dynamically adjusting driving of the autonomous vehicle based on the comparison to minimize the difference between the time required for the autonomous vehicle to complete the portion of the current trip in the selected AD mode and the historical average time.

According to another embodiment of the disclosure, there is provided an autonomous vehicle. The autonomous vehicle includes: a human-machine interaction interface (HMI) configured to receive trip information of a current trip of a user of the autonomous vehicle; a communication unit configured to receive historical traffic information related to the current trip; and an autonomous driving (AD) control unit. The AD control unit includes: an obtaining module configured to obtain the trip information and the historical traffic information; a determining module configured to select an autonomous driving (AD) mode that is suitable for the current trip from a plurality of pre-defined AD modes; a comparing module configured to compare time required for the autonomous vehicle to complete a portion of the current trip in the selected AD mode with historical average time taken to complete the portion of the current trip, the historical average time being acquired based on the historical traffic information; and an adjusting module configured to dynamically adjust driving of the autonomous vehicle based on the comparison to minimize the difference between the time required for the autonomous vehicle to complete the portion of the current trip in the selected AD mode and the historical average time.

According to yet another embodiment of the disclosure, there is provided a non-transitory computer-readable medium with instructions stored therein which, when executed, cause one or more processors to carry out the steps including: obtaining trip information of a current trip of a user of the autonomous vehicle and historical traffic information related to the current trip; selecting an autonomous driving (AD) mode that is suitable for the current trip from a plurality of pre-defined AD modes; comparing time required for the autonomous vehicle to complete a portion of the current trip in the selected AD mode with historical average time taken to complete the portion of the current trip, the historical average time being acquired based on the historical traffic information; and dynamically adjusting driving of the autonomous vehicle based on the comparison to minimize the difference between the time required for the autonomous vehicle to complete the portion of the current trip in the selected AD mode and the historical average time.

BRIEF DESCRIPTION OF THE DRAWINGS

The disclosed aspects will hereinafter be described in connection with the appended drawings that are provided to illustrate but not to limit the scope of the disclosure.

DETAILED DESCRIPTION

The present disclosure generally relates to a control strategy for controlling autonomous driving to optimize user experience. The control strategy includes selecting an autonomous driving mode (AD mode) from a plurality of pre-defined AD modes and adjusting a driving style of an autonomous vehicle when the autonomous vehicle drives itself with the selected AD mode.

Solutions of the disclosure can be applied to a vehicle configured with vehicular automation, that is, a ground vehicle capable of sensing its environment and moving safely with little or no human intervention.

According to embodiments of the disclosure, autonomous driving can include partial automation (e.g., a vehicle drives itself using information about the driving environment and a human driver will take over to intervene upon prompt) and full automation (e.g., the vehicle drives itself and the human driver is never required to take control to operate the vehicle).

In an embodiment of the disclosure, an autonomous vehicle includes an advanced driving assistance system (ADAS) or an autonomous driving (AD) system for the autonomous driving.

Figure 1:
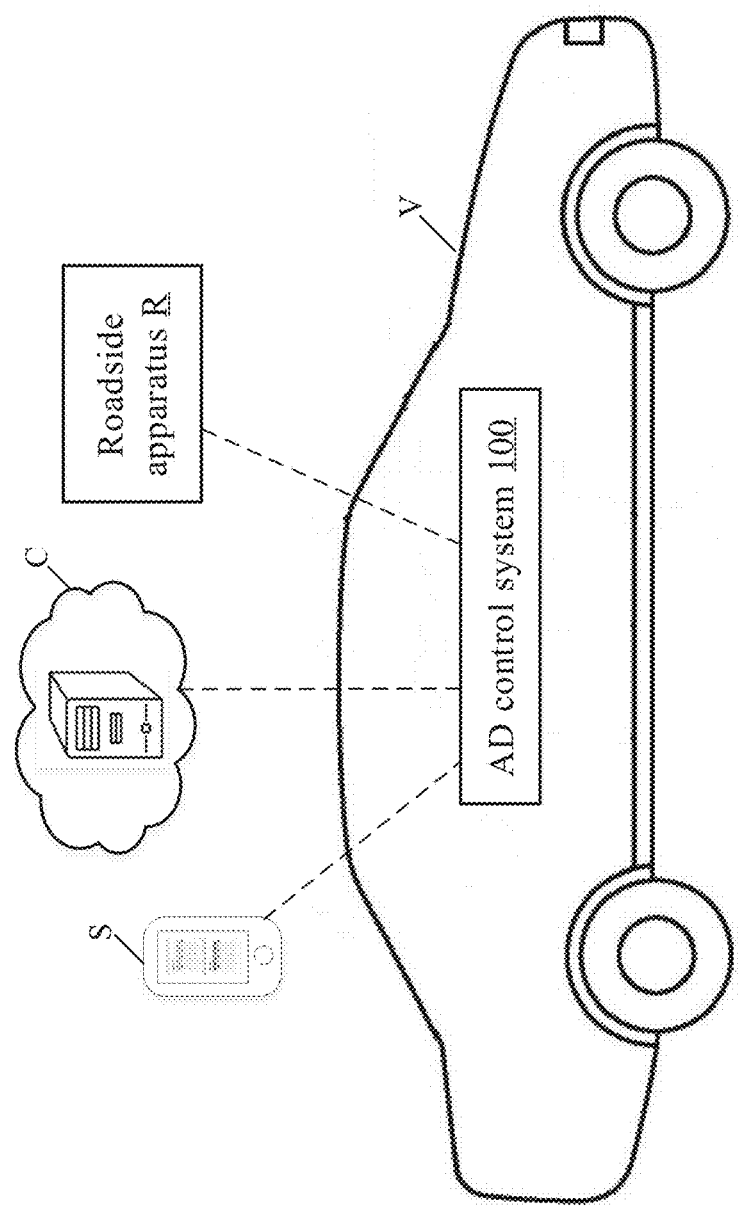
FIG. 1 is an exemplary environment in which an embodiment of the disclosure can be implemented.

FIG. 1 shows an environment in which embodiments of the present disclosure can be implemented. The environment of FIG. 1 includes an autonomous vehicle V and external devices in communication with the autonomous vehicle V. The autonomous vehicle V is provided with an autonomous driving control system (AD control system) 100. As shown in FIG. 1, the external devices include a roadside apparatus R, a cloud server C, and an intelligent device S (e.g., a smartphone of a user of the autonomous vehicle V). The environment shown in FIG. 1 can be seen as an ecosystem system in which the autonomous vehicle V can communicate with the external devices. In an example, the autonomous vehicle V is one of a robo-taxi, an e-taxi, a shared car, and an electric vehicle (EV) available on a ride-hailing APP. Notably, the present disclosure is not limited to the specific architecture shown in FIG. 1.

Figure 2:
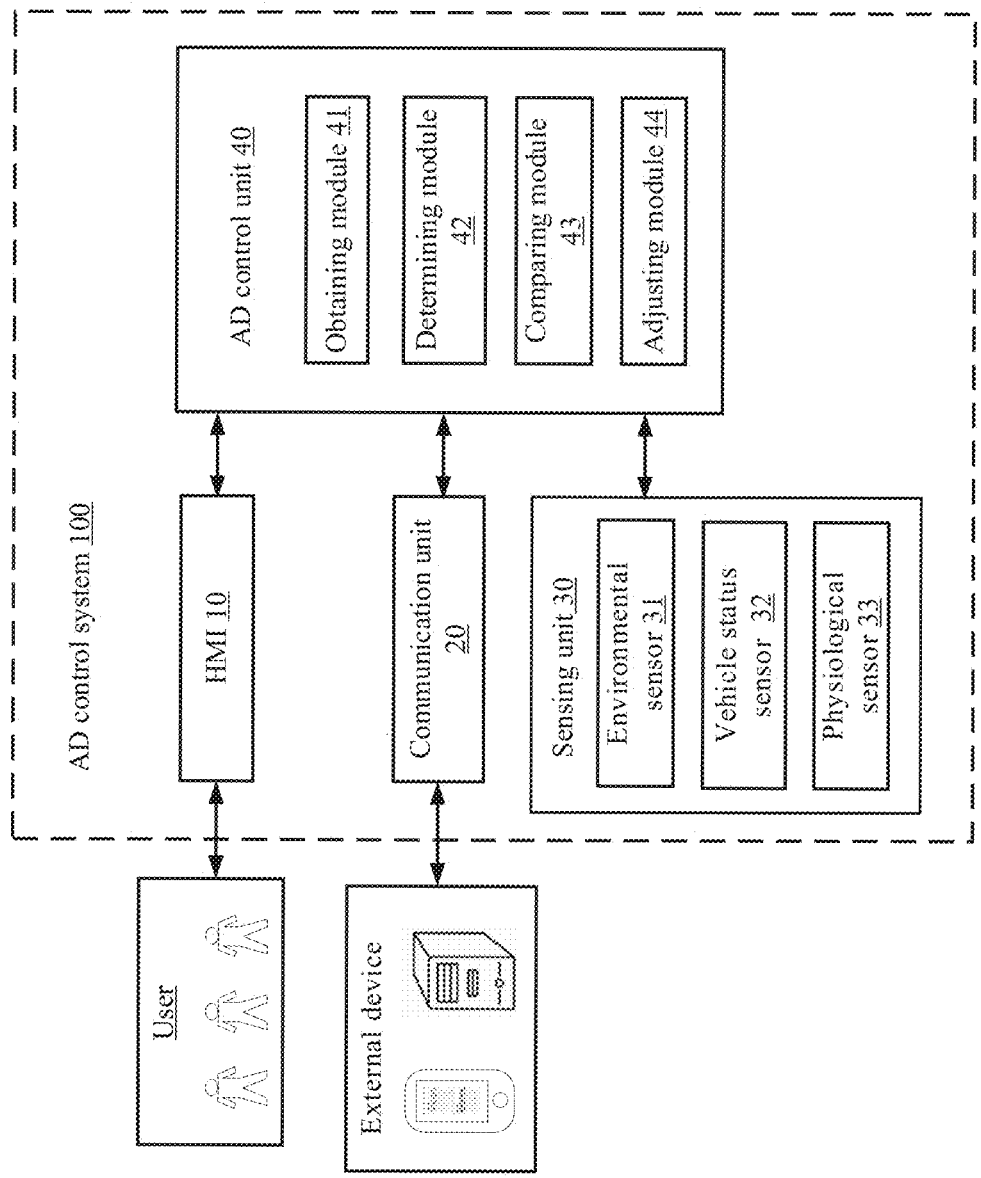
FIG. 2 is a schematic block diagram of a control system for an autonomous vehicle according to an embodiment of the disclosure.

FIG. 2 schematically shows an AD control system 100 according to an embodiment of the present disclosure. For example, the AD control system 100 is disposed in the autonomous vehicle V.

As shown in FIG. 2, the AD control system 100 includes a human-machine interface (HMI) 10, a communication unit 20, a sensing unit 30, and an autonomous driving control unit (AD control unit) 40.

The HMI 10 is communicatively connected to the AD control unit 40. The HMI 10 facilitates information interactions between the autonomous vehicle V and a user of the autonomous vehicle V. For example, the HMI 10 receives an input from the user, transmits the input to the AD control unit 40, and provides information on environment status and vehicle status to the user.

The HMI 10 can facilitate the information interactions by means of a variety of types of human-machine interactions, such as a touch screen, voice control, motion detection, gesture recognition, iris recognition, and brain wave signal recognition.

In an example, at the beginning of a trip for a user of the autonomous vehicle V, the HMI 10 receives trip information including a starting point, an ending point, and a desired arrival time from the user. Next, the HMI 10 transmits the received trip information to the AD control unit 40 so that the AD control unit 40 selects an AD mode that is suitable for the purpose of the trip from a plurality of pre-defined AD modes. When the autonomous vehicle V is driving itself with the selected AD mode, the HMI 10 may receive a user input regarding the user's expectation such as "more comfortable", "faster", or "slower". In this case, the AD control unit 40 adjusts the driving style of the autonomous vehicle V to meet the user's expectation.

The communication unit 20 communicatively connects with the external devices, e.g., via wired and/or wireless communication. In other words, the autonomous vehicle V can exchange information with the external devices via the communication unit 20. In an example, a wireless communication such as 3G/4G/5G, C-V2X, DSRC, Wi-Fi, or Bluetooth can be employed between the autonomous vehicle V and each of the external devices.

It is noted that an external device refers to a device that is not an integral part of the autonomous vehicle V. The external device is, for example, a cloud server communicated with the autonomous vehicle V via a wireless network, an edge server communicated with the autonomous vehicle V via a wireless network, a roadside facility communicated with the autonomous vehicle V via a C-V2X unit, another autonomous vehicle wirelessly communicated with the autonomous vehicle V via a V2V unit, an electronic device wirelessly communicated with the autonomous vehicle V.

The communication unit 20 receives information from the external devices and transmits the received information to the AD control unit 40. The received information includes information on user requests, trip plans, historical traffic flows, navigation, environment conditions, and traffic conditions.

Information on User Requests

The information on user requests may include trip requests from users. A trip request includes a current location of a user, a destination and a desired arrival time. In an example, the user transmits a trip request including his or her current location and a destination to an autonomous driving platform via his or her portable intelligent device. Then, the autonomous driving platform transmits the user's location and the destination to one or more autonomous vehicles near the user.

Information on Trip Plans

The information on trip plans may include a calendar or trip planner of the user. In an example, the AD control system 100 obtains a calendar of a user from his or her portable intelligent device via the communication unit 20, and determines the next trip plan for the user according to the user's calendar.

Information on Historical Traffic Flows

The information on historical traffic flows may include historical traffic flows related to trips in the calendar. In an example, the AD control system 100 obtains historical traffic flows related to the next trip of the user. The historical average time for the next trip can be calculated based on the obtained historical traffic flows.

Information on Navigation

The information on navigation may include maps (e.g., HD maps) and navigating routes (e.g., navigating routes for the next trip) for autonomous driving of the autonomous vehicle V.

Information on Environment Conditions

The information on environment conditions may include weather conditions and ambient conditions. In an example, the ambient conditions, such as fog, hail, cloudy days, rain, visibility, temperature, wind speed, brightness and rainfall, are detected by a roadside sensor and transmitted to the autonomous vehicle V. The weather conditions are retrieved from a weather forecast and transmitted to the autonomous vehicle V.

Information on Traffic Conditions

The information on traffic conditions may include traffic situations and traffic rules. In an example, the information on traffic conditions includes information of a traffic accident that occurs at an intersection on the navigating route that the autonomous vehicle V is going to pass through. The information of the traffic accident may be detected by a roadside sensor and transmitted to a cloud server from the roadside sensor. Then, the information of the traffic accident is transmitted to the autonomous vehicle V when the autonomous vehicle V approaches the intersection.

The sensing unit 30 includes a plurality of in-vehicle sensors such as an environmental sensor 31 for sensing an ambient environment, a vehicle status sensor 32 for sensing vehicle status, and a physiological sensor 33 for sensing a physiological condition of a user of the autonomous vehicle V. Outputs of the sensors can be transmitted to the AD control unit 40 via one or more vehicle buses.

In an example, the environmental sensor 31 includes a plurality of environmental sensors such as a camera sensor (e.g., a single-target camera, multi-target camera or panoramic camera) and a radar sensor (e.g., an ultrasonic radar or millimeter-wave radar, and a Lidar). The plurality of environmental sensors can be arranged at different positions of a vehicle to ensure safety redundancy, that is, to ensure that environmental conditions around the vehicle can be adequately detected.

In an example, the vehicle status sensor 32 includes a plurality of vehicle status sensors for directly or indirectly measuring various parameters of the autonomous vehicle V. The plurality of vehicle status sensors may include a wheel speed sensor, a displacement sensor, an acceleration sensor, and a steering angle sensor.

In an example, the physiological sensor 33 includes a plurality of physiological sensors for detecting a physiological condition of the user. The plurality of physiological sensors may include an infrared sensor, a fingerprint acquisition device, a pulse acquisition device, a heartbeat acquisition device, a pupil detection device, and a body temperature detection device. For example, the physiological condition may include health status such as a fever, car sickness, or a cold; emotional status such as high stress, anxiety, or happiness; and user status such as reading, sleeping, or listening to music.

The AD control unit 40 is communicatively connected to the HMI 10, the communication unit 20 and the sensing unit 30, respectively. The AD control unit 40 is configured to select an autonomous driving mode (AD mode) based on information received from the HMI 10, the communication unit 20, and the sensing unit 30. The AD control unit 40 is further configured to dynamically adjust a driving style of the autonomous vehicle V, which is driving itself in the selected AD mode, so as to optimize the user experience. In this way, the autonomous vehicle is not merely an automated transport vehicle but a smart mobile space.

With reference to FIG. 2, the AD control unit 40 includes an obtaining module 41, a determining module 42, a comparing module 43 and an adjusting module 44. The AD control unit 40 and its modules can be implemented by means of hardware or software or a combination of hardware and software, including code stored in a non-transitory computer-readable medium and implemented as instructions executed by a processor. Regarding implementation by means of hardware, it may be implemented in application-specific integrated circuit (ASIC), digital signal processor (DSP), data signal processing device (DSPD), programmable logic device (PLD), field programmable gate array (FPGA), processor, controller, microcontroller, microprocessor, electronic unit, or a combination thereof. The implementation by software may include microcode, program code or code segments. The software may be stored in a machine-readable storage medium, such as a memory.

It is noted that the AD control unit 40 and its modules are named functionally (logically) and their physical positions are not limited by their functional names. In other words, the modules may be included in the same chip or circuit. The modules may also be provided in different chips or circuits. One or more of these modules may also be further functionally divided into sub-modules or combined together.

In an example, the AD control unit 40 can include a memory and a processor. The memory stores instructions that, when executed by the processor, cause the processor to execute the autonomous driving method according to an embodiment of the present disclosure.

In an example, the AD control unit 40 is implemented as software. The software is provided in an ECU, a VCU or a domain controller of the vehicle.

Figure 3:
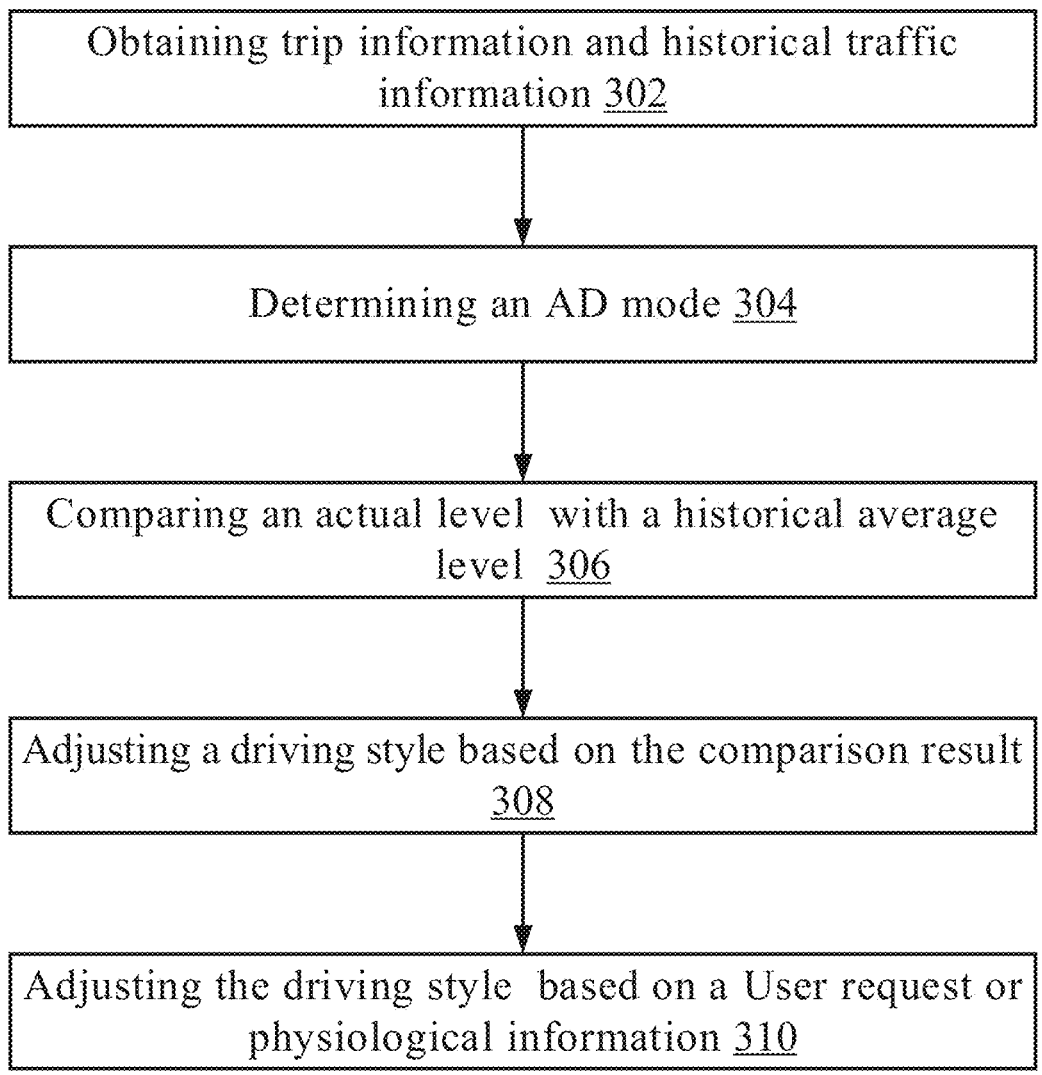
FIG. 3 shows an autonomous driving control process according to an embodiment of the disclosure.

FIG. 3 illustrates an autonomous driving control process 300 according to an embodiment of the present disclosure. This process 300 can be performed by means of the AD control unit 40 or the AD control system 100. Thus, the above described features of the AD control unit 40 and the AD control system 100 are also applicable here.

In block 302, the obtaining module 41 obtains trip information of a current trip for a user of the autonomous vehicle V and historical traffic information associated with the current trip.

In an example, the user inputs the trip information to the HMI 10 and the obtaining module 41 obtains the trip information from the HMI 10. In an embodiment, the user is in the autonomous vehicle V and inputs trip information including a destination and desired arrival time to a voice-activated HMI of the autonomous vehicle V. In another embodiment, the user is in the autonomous vehicle V and inputs the trip information including the destination and desired arrival time via a touch screen of the autonomous vehicle V.

In another example, the obtaining module 41 obtains a calendar of the user from the user's mobile device via the communication unit 20. The trip information can be acquired from the calendar.

In yet another example, the communication unit 20 receives a user request including the trip information. For example, the user is outside the autonomous vehicle V and the trip request including a starting point, an ending point, and a desired arrival time is transmitted to an autonomous vehicle platform (e.g., a robo-taxi management platform) via the user's mobile device. The platform transmits the user's trip request to autonomous vehicles near the starting point. In this case, the autonomous vehicle V is near the starting point and receives the trip request via the communication unit 20. Then, the autonomous vehicle V transmits a message indicating it is going to the starting point to pick up the user.

The historical traffic information associated with the current trip can be obtained from a cloud server via the communication unit 20. The historical traffic information may include historical traffic flows associated with the current trip. The historical traffic flows can be acquired from a network of connected vehicles.

In block 304, the determining module 42 determines an AD mode that is suitable for the current trip. For example, the determining module 42 determines a destination of the current trip based on the obtained information and selects the AD mode that is suitable for the destination from a plurality of pre-defined AD modes.

The plurality of pre-defined AD modes include a time priority mode, a comfort priority mode, a commute mode, and an economy mode. Each AD mode is described below.

Time Priority Mode

The time priority mode could also be called a time-first mode. The time priority mode focuses on time it takes to complete a trip. The time priority mode is applicable to a trip with a destination such as an airport, a train station, or a bus stop. The time priority mode is also applicable to a trip for participating in a business meeting, where the time is tight to arrive in time. For such a trip, the user expects to reach the destination as soon as possible, and thus the time priority mode is suitable.

Comfort Priority Mode

The comfort priority mode focuses on comfort of a trip. The comfort priority mode is applicable to a trip such as traveling with friends or sleeping on the way. In this case, the user expects a comfortable trip. In such a trip, the user does not expect to rush to the destination, and thus the comfort priority mode is suitable.

Commute Mode

The commute mode is applicable to trips such as commuting between the office and home. In such trips, the user expects a balance between arrival time and comfort. In the commute mode, comfort should be prioritized as along as the autonomous vehicle V can reach a destination in time.

Economy Mode

The economy model focuses on saving energy. The economy model is applicable to a trip such as a long-distance travel or where charging stations along the way are limited. In such a trip, the user expects that the autonomous vehicle V drives in an energy saving manner. In such a trip, the number of refueling or charging should be minimized, thereby reducing range anxiety of the user.

In an example, each of the above mentioned AD modes includes a combination of logical limitations. The logical limitations include speed logic, acceleration logic, energy consumption logic, overtaking logic, lane-change logic, and navigation logic.

In one example, each of the speed logic, the acceleration logic, the energy consumption logic, the overtaking logic, the lane-change logic, and the navigation logic includes one or more threshold parameters. For example, the overtaking logic includes an overtaking success rate threshold. The speed logic includes a speed limit. The acceleration logic includes an acceleration threshold, and the acceleration threshold includes an acceleration threshold for safety (a safety threshold) and an acceleration threshold for comfort (a comfort threshold).

In an example, the overtaking success rate threshold is set to 60% as a critical value. That is to say, if an overtaking success rate in a current traffic condition is greater than 60%, the autonomous vehicle V will have a recommendation of overtaking.

The overtaking success rate in the current traffic condition is related to a variety of factors in the current traffic condition, such as overtaking space (e.g., a distance between the autonomous vehicle V and the vehicle in front as well as vehicle in the neighboring lanes), a relative vehicle speed (e.g., a relative vehicle speed between the autonomous vehicle V and the vehicle to be overtaken), a width and curvature of a road on which the autonomous vehicle V is travelling, and a complexity degree of an ambient environment (e.g., a number of traffic participants in the ambient environment). For example, the larger the overtaking space is, the higher the overtaking success rate is. On the contrary, the smaller the overtaking space is, the lower the overtaking success rate is. It is noted that the disclosure does not limit a method of how to calculate the overtaking success rate in a current traffic condition.

In an example, the lane-changing success rate is set to 60% as a critical value. That is to say, if a lane-changing success rate in a current traffic condition is greater than 60%, the autonomous vehicle V will have a recommendation of overtaking.

The lane-changing success rate in the current traffic condition is related to a variety of factors in the current traffic condition, such as lane-changing space (e.g., a distance between the autonomous vehicle V and the vehicle in front as well as vehicle in the neighboring lanes), and a relative vehicle speed (e.g., a relative vehicle speed between the autonomous vehicle V and an adjacent vehicle). For example, the larger the lane-change space is, the higher the lane-change success rate is. On the contrary, the smaller the lane-change space is, the lower the lane-change success rate is.

The acceleration threshold includes the safety threshold and the comfort threshold. In an emergency situation, an aggressive driving style with a recommended acceleration that exceeds the comfort threshold but does not exceed the safety threshold may be applied to the autonomous vehicle V. This may cause discomfort to an occupant in the vehicle, but still comply with the autonomous driving safety requirements.

It is noted that an acceleration of a vehicle includes a lateral acceleration and a longitudinal acceleration. Accordingly, the acceleration threshold also includes a lateral threshold for the lateral acceleration and a longitudinal threshold for the longitudinal acceleration. The above descriptions are applicable for each of the lateral threshold and the longitudinal threshold.

It is noted that the acceleration threshold including the safety threshold and the comfort threshold can be determined based on various factors, such as a vehicle type (e.g., a truck, a car, or a commercial vehicle), traffic regulations, weather and road conditions, and customized needs. The present disclosure does not limit a method of how to determine the acceleration threshold.

In the following, examples of logical limitations for different autonomous driving modes are described. Notably, the numbering of the following exemplary logic limitations is not intended to indicate or limit the sequencing of these limitations.

Logical Limitations of the Time Priority Mode

1) Keep a speed of the autonomous vehicle V close to a speed limit of a road on which the autonomous vehicle V is travelling. For example, the speed of the autonomous vehicle V should be kept at 80%-95% of the speed limit.

2) If the above mentioned speed requirement cannot be met, a recommendation of overtaking or lane changing is generated. For example, if the above mentioned speed requirement cannot be met, a recommendation of overtaking is generated when an overtaking success rate under a current traffic condition is greater than the overtaking success rate threshold.

3) Recommend an acceleration that exceeds the comfort threshold but does not exceed the safety threshold.

4) Energy consumption is not limited.

Logical Limitations of the Comfort Priority Mode

1) Recommend an acceleration that does not exceed the comfort threshold.

2) Minimize overtaking or lane changing as much as possible. For example, a recommendation of overtaking or lane changing is generated only if the current speed of the autonomous vehicle V is less than an average traffic speed of a road on which the autonomous vehicle V is travelling (e.g., the current speed of the autonomous vehicle V is less than 70% of the average traffic speed) and an overtaking or lane-changing success rate under a current traffic condition is higher than the overtaking or lane-change success rate threshold.

3) Energy consumption is not limited.

Logical Limitations of the Commute Mode

1) Make commute time as close to the historical average commute time as possible. For example, the commute time estimated based on a current traffic condition and a current speed of the autonomous vehicle V should not be greater than the historical average commute time. In an example, time required for the autonomous vehicle V to complete a portion of a current trip should not exceed the historical average time taken to complete the portion of the current trip.

2) If the above mentioned requirement cannot be met, a recommendation of overtaking or lane changing is generated. For example, a recommendation of overtaking or lane changing is generated when an overtaking success rate under a current traffic condition is greater than the overtaking success rate threshold or a lane-changing success rate under the current traffic condition is greater than the lane changing success rate threshold.

3) Energy consumption should fall under an energy consumption threshold in this mode so as to reduce range anxiety of the user.

4) An acceleration of the autonomous vehicle V should not exceed the comfort threshold. That is to say, the autonomous driving should still prioritize comfort when it can.

Logical Limitations of the Economy Mode

1) Keep energy consumption at a relatively low level as compared to energy consumption levels in other modes.

In an example, the pre-defined autonomous driving modes are extensible. That is to say, in addition to the above mentioned autonomous driving modes, one or more other autonomous driving modes can be provided.

In an example, each of the logical limitations is adaptive and extensible. That is to say, in addition to the above mentioned logical limitations, one or more additional logical limitations can be provided. Moreover, each of the above mentioned logical limitations can be adaptive, which means a logic limitation can adapt to a specific application scenario or user requirement. For example, any of the above mentioned logical limitations can be adjusted according to the specific application scenario or user requirement.

Examples of AD modes and logical limitations are further described in Table 1. In Table 1, the symbol "-" represents no limitation, "$a_x$" represents a lateral acceleration of the autonomous vehicle V, "$a_y$" represents a longitudinal acceleration of the autonomous vehicle V, "$a_{x\text{-}uncom}$" represents a lateral comfort threshold, "$a_{y\text{-}uncom}$" represents a longitudinal comfort threshold, "$a_{x\text{-}unsafe}$" represents a lateral safety threshold, "$a_{y\text{-}unsafe}$" represents a longitudinal safety threshold, and "speed limit" represents a speed limit of a road on which the autonomous vehicle V is travelling.

TABLE 1

| AD mode | Speed logic | Acceleration logic | Energy consumption logic | Overtaking logic | Navigation logic |
|---|---|---|---|---|---|
| Time priority mode | Keep the vehicle speed at the speed limit | $a_x < a_{x\text{-}unsafe}$<br>$a_y < a_{y\text{-}unsafe}$ | — | 1) The current speed is less than 95% of the speed limit; and<br>2) The current overtaking success rate is greater than the corresponding threshold<br>If 1) and 2) are both met, recommend overtaking | Recommend a route with the shortest time |
| Comfort priority mode | Keep the vehicle speed at 70%-100% of the speed limit | $a_x < a_{x\text{-}uncom}$<br>$a_y < a_{y\text{-}uncom}$ | — | 1) The current speed is less than 70% of the speed limit; and<br>2) The current overtaking success rate is greater than the corresponding threshold<br>If 1) and 2) are both met, recommend overtaking | Recommend a route with the maximum comfort. |
| Commute mode | Keep the vehicle speed at 80%-100% of the speed limit | $a_x < a_{x\text{-}uncom}$<br>$a_y < a_{y\text{-}uncom}$ | <a first energy consumption threshold (e.g., 4.5 L/100 km on avg or 16 kWh/100 km on avg) | 1) The current speed is less than 85% of the speed limit; and<br>2) The current overtaking success rate is greater than the corresponding threshold<br>If 1) and 2) are both met, recommend overtaking | Recommend a route with a balance between cost, energy consumption, time, and comfort |
| Economy mode | The vehicle speed is determined based on an energy-saving solution | $a_x < a_{x\text{-}uncom}$<br>$a_y < a_{y\text{-}uncom}$ | <a second energy consumption threshold that is lower than the first energy consumption | 1) The current speed is less than the determined speed<br>Then recommend overtaking | Recommend a route to avoid toll stations |

TABLE 1-continued

| AD mode | Speed logic | Acceleration logic | Energy consumption logic | Overtaking logic | Navigation logic |
|---------|-------------|--------------------|--------------------------|-------------------|------------------|
|         |             |                    | threshold (e.g., 4 L/100 km on avg or 13 kWh/100 km on avg) |                   |                  |

In an embodiment, the determining module 42 analyzes the trip information to determine a destination of the current trip. The destination could show the purpose of the current trip. For example, the determining module 42 determines that the user is going to catch a plane, travel, or attend a meeting by analyzing the destination of the current trip. Next, the determining module 42 determines a priority factor according to the destination of the current trip, such as, a shortest time, a maximum comfort, or a lowest energy consumption. Next, the determining module 42 selects a suitable AD mode from the plurality of the predetermined AD modes so that the autonomous vehicle V drives itself with the selected AD mode.

In block 306, the comparing module 43 compares an actual level with a historical average level to generate a comparison result, which could be one of the actual level being higher than the historical average level, the actual level being lower than the historical average level, and the actual level being equal to the historical average level.

In an example, the actual level is expressed by time it takes for the autonomous vehicle V to complete a portion of the current trip in the selected AD mode. The historical average level is expressed by historical average time. The historical average time refers to the average time it takes to complete the portion of the current trip according to historical traffic flows related to the current trip. It is noted that the historical traffic flows include autonomous vehicles and human-driving vehicles. That is to say, the actual driving level of autonomous driving on a road section is compared with the historical average level acquired based on both autonomous driving and human driving on the road section.

An example of how to determine the historical average time is described below.

In an example, the historical average time is determined based on related historical traffic flows, such as historical traffic flows during the same time of day in the past week or same day of the week in the past month, or the same holiday in the last year as the current trip. In an embodiment, if it is Wednesday morning, the related historical traffic flows include the historical traffic flows on Wednesday mornings, and the related historical traffic flows are used to calculate the historical average time. This is particularly applicable to scenarios where, for example in certain cities in China, vehicles with plate number ending with an odd digit are only allowed on public roads on odd-numbered dates and those with an even digit on even-numbered dates. In another embodiment, if today is the National Holiday, the related historical traffic flows include historical traffic flows of the National Holidays in the past few years to calculate the historical average time.

An example of the comparison between the actual level and the historical average level is described below.

In an example, the autonomous vehicle V is driving itself in the commute mode. It takes 10 minutes to complete ⅕ of the current trip. If the historical average time for completing ⅕ of the current trip is 15 minutes, the actual level is higher than the historical average level, and thus the autonomous vehicle V does not need to accelerate and may actually slow down. If the historical average time for completing ⅕ of the current trip is 8 minutes, the actual level is lower than the historical average level, and thus the autonomous vehicle needs to accelerate to make up the time. If the historical average time to complete ⅕ of the current trip is also 10 minutes, the actual level is equal to the historical average level, and thus the autonomous vehicle does not need to accelerate.

In block 308, the adjusting module 44 adjusts the current driving style of the autonomous vehicle V based on the comparison result, so as to move the actual level as close to the historical average level as possible. In other word, the driving style is adjusted to minimize the difference between the actual level and the historical average level. For example, in the case that the actual level is lower than the historical average level, the adjusting module 44 can make the driving style more aggressive or enable a relatively more aggressive or sporty driving style. In the case that the actual level is higher than the historical average level, the adjusting module 44 can make the driving style more moderate or enable a relatively more conservative or moderate driving style.

In an example, the adjusting module 44 adjusts one or more of the overtaking success rate threshold, the lane-changing success rate threshold, the speed limit, the safety threshold, and the comfort threshold to enable a relatively more aggressive or moderate driving style of the autonomous vehicle V.

In an embodiment, the adjusting module 44 adjusts a driving style of the autonomous vehicle V so that a difference between the actual time for completing a portion of the current trip and the historical average time is not greater than a time threshold. The time threshold can be predetermined based on a traffic scene and the length of the current trip. That is to say, the time threshold could be different for different trips. For example, the longer the length of the trip is, the greater the time threshold is.

In another example, in the comfort priority mode, the adjusting module 44 adjusts the driving style of the autonomous vehicle V so that aggressive driving behaviors are avoided, overtaking or lane change is minimized, changes in the acceleration are linear or moderate, or an acceleration that does not exceed the comfort threshold is recommended.

In an example, in the time priority mode, the adjusting module 44 adjusts the driving style of the autonomous vehicle V so that overtaking or lane change occurs as much as needed, the vehicle speed is maintained as close to the speed limit as possible, or an acceleration that could exceed the comfort threshold but does not exceed the safety threshold is recommended.

In an example, in the time priority mode and the commute mode, in the case that the actual level is lower than the historical average level (e.g. the actual time to complete one portion of the current trip is longer than the historical average time), it is particularly important to adjust the driving style to make the driving style more aggressive so as to reach the destination in time.

In block 310, the adjusting module 44 adjusts the driving style by a minimum adjustment unit based on a request from the user or a physiological condition of the user.

The minimum adjustment unit is predefined for each of the overtaking success rate threshold, the lane-changing success rate threshold, the speed limit, the safety threshold, and the comfort threshold. For example, the minimum adjustment unit for the speed limit is 5% of the speed limit, and thus the speed of the autonomous vehicle V can be increased or decreased by 5% of the speed limit each time.

In an example, the HMI 10 receives a user input such as "faster", "more comfortable", or "lower energy consumption". The adjusting module 44 adjusts the driving style according to the user input. For example, if the user input is "faster," the adjusting module 44 will increase the speed of the autonomous vehicle V by the minimum adjustment unit (e.g., 5% of the speed limit). If the user inputs "faster" one more time, the adjusting module 44 will increase the speed of the autonomous vehicle V by the minimum adjustment unit one more time.

In another example, the physiological sensor 33 of the sensing unit 30 collects physiological signals of the user in the autonomous vehicle V. A physiological condition of the user such as a fever, nervousness, or happiness can be acquired based on the physiological signals. The adjusting module 44 adjusts the driving style according to the user's physiological condition. For example, if the user has a fever, the adjusting module 44 will increase the speed of the vehicle by the minimum adjustment unit so as to reach the destination earlier.

Figure 4:
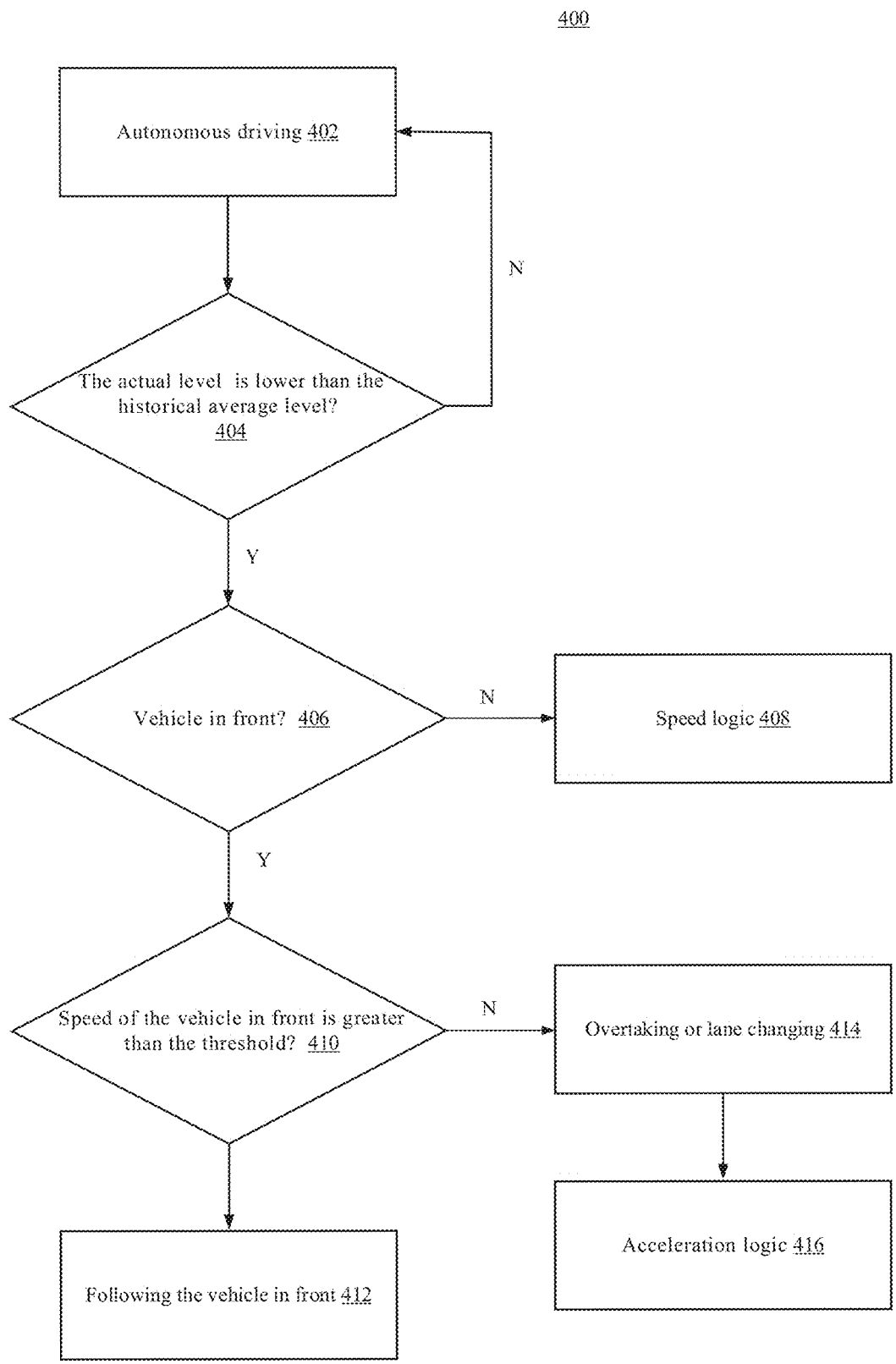
FIG. 4 shows a driving style adjusting process according to an embodiment of the disclosure.

FIG. 4 illustrates an exemplary adjusting process 400 for adjusting the driving style. The adjusting process 400 can be performed by means of the adjusting module 44.

Referring to FIG. 4, in block 402, the autonomous vehicle V drives itself with the commute mode or the time priority mode.

In block 404, the adjusting module 44 determines whether the actual level of autonomous driving of the autonomous vehicle V is lower than the historical average level. For example, the adjusting module 44 determines whether the time it takes for the autonomous vehicle V to complete a portion of a current trip is greater than historical average time taken to complete the portion of the current trip.

If it is determined that the actual level is not lower than the historical average level, the process 400 returns to block 402. For example, if the adjusting module 44 determines that the time it takes for the autonomous vehicle to complete the portion of the current trip is not greater than the historical average time taken to complete the portion of the current trip, the process 400 returns to block 402.

If it is determined that that actual level is lower than the historical average level, the process 400 proceeds to block 406. For example, if the adjusting module 44 determines that the time it takes for the autonomous vehicle V to complete the portion of the current trip is greater than the historical average time taken to complete the portion of the current trip, the process 400 then proceeds to block 406.

In block 406, the adjusting module 44 determines whether there is a vehicle in front of the autonomous vehicle V.

If it is determined that there is no vehicle in front of the autonomous vehicle V, the process 400 proceeds to block 408. In block 408, the adjusting module 44 performs the speed logic for increasing the speed of the autonomous vehicle V. According to the speed logic, in the case that there is no vehicle in front of the autonomous vehicle V, the adjusting module 44 adjusts the driving style so that the speed of the autonomous vehicle V is close to the speed limit of the road on which the autonomous vehicle V is travelling. For example, the speed of the autonomous vehicle V is adjusted to a predetermined percentage of the speed limit, such as 90% of the speed limit.

If it is determined that there is a vehicle in front of the autonomous vehicle V, the process 400 proceeds to block 410.

In block 410, the adjusting module 44 determines whether a speed of the vehicle in front is greater than a predetermined percentage (e.g., 80%, 85%, or 90%) of the speed limit of the road on which the autonomous vehicle V is travelling.

If it is determined that the speed of the vehicle in front is greater than the predetermined percentage of the speed limit, the process 400 proceeds to block 412. In block 412, the adjusting module 44 performs the speed logic for following the vehicle in front. According to the speed logic, the autonomous vehicle V follows the vehicle in front and keeps a safe following distance from the vehicle in front.

If it is determined that the speed of the vehicle in front is not greater than the predetermined percentage of the speed limit, the process 400 proceeds to block 414. In block 414, the adjusting module 44 performs the overtaking logic or the lane-changing logic. According to the overtaking logic, if an overtaking success rate under a current traffic condition is greater than the overtaking success rate threshold, a recommendation of overtaking is generated. If the overtaking success rate under the current traffic condition is not greater than the overtaking success rate threshold, the recommendation of overtaking is not generated, and the autonomous vehicle V waits for an overtaking opportunity, i.e., the overtaking success rate under the current traffic condition becomes greater than the overtaking success rate threshold. Similarly, according to the lane-changing logic, if a lane-change success rate under a current traffic condition is greater than the lane-change success rate threshold, a recommendation of lane changing is generated. If the lane-change success rate under the current traffic condition is not greater than the lane-changing success rate threshold, the recommendation of lane changing is not generated, and the autonomous vehicle waits for a lane-change opportunity, i.e., the lane-changing success rate under the current traffic condition becomes greater than the lane-change success rate threshold.

If a recommendation of overtaking or lane-changing is generated, the process 400 proceeds to block 416. In block 416, the adjusting module 44 performs the acceleration logic. According to the acceleration logic, in the commute mode or the time priority mode, the autonomous vehicle V has a recommended acceleration that exceeds the comfort threshold but does not exceed the safety threshold. In addition, after block 416, the process 400 can go back to block 408 to keep the autonomous vehicle V at a high speed below the speed limit. The above mentioned steps can be repeated until the driving style of the autonomous vehicle V does not need to be changed.

In an embodiment, the overtaking logic further includes a lower exceptional overtaking success rate threshold and a threshold for the number of exceptional overtaking. There may be an emergency situation where overtaking is necessary; however, the overtaking success rate threshold is not met. In this case, according to the overtaking logic, a recommendation of overtaking can be generated if an overtaking success rate under a current traffic condition is greater than the lower exceptional overtaking success rate threshold. That is to say, in the emergency situation, overtaking could occur even if the overtaking success rate threshold is not met. Moreover, in this case, the number of such exceptional overtaking should be less than the threshold for the number of exceptional overtaking. That is to say, such overtaking should not occur frequently. In an example, the threshold for exceptional overtaking is equal to 10% of the total number of overtakes during the current trip.

Similarly, in an embodiment, the lane-change logic further includes a lower exceptional lane-changing success rate threshold and a threshold for exceptional lane changing. There may be an emergency situation where lane changing is necessary; however, the lane-changing success rate threshold is not met. In this case, according to the lane-changing logic, a recommendation of lane changing is generated if a lane-change success rate under a current traffic condition is greater than the lower exceptional lane-change success rate threshold. That is to say, in the emergency situation, lane changing could still occur even if the lane-changing success rate threshold is not met. Moreover, in this case, the number of lane changes should be less than the threshold for exceptional lane changing. That is to say, such lane changing should not occur frequently. In an example, the threshold for exceptional lane changing is equal to 10% of a total number of lane changes during the current trip.

In addition, for example, there may be a case where the autonomous vehicle V travels to pick up the user in response to the user's trip request; however, time required for the autonomous vehicle V to drive to the user's location is more than an estimated time. In this case, the driving style of the autonomous vehicle V can be more aggressive or assertive.

Figure 5:
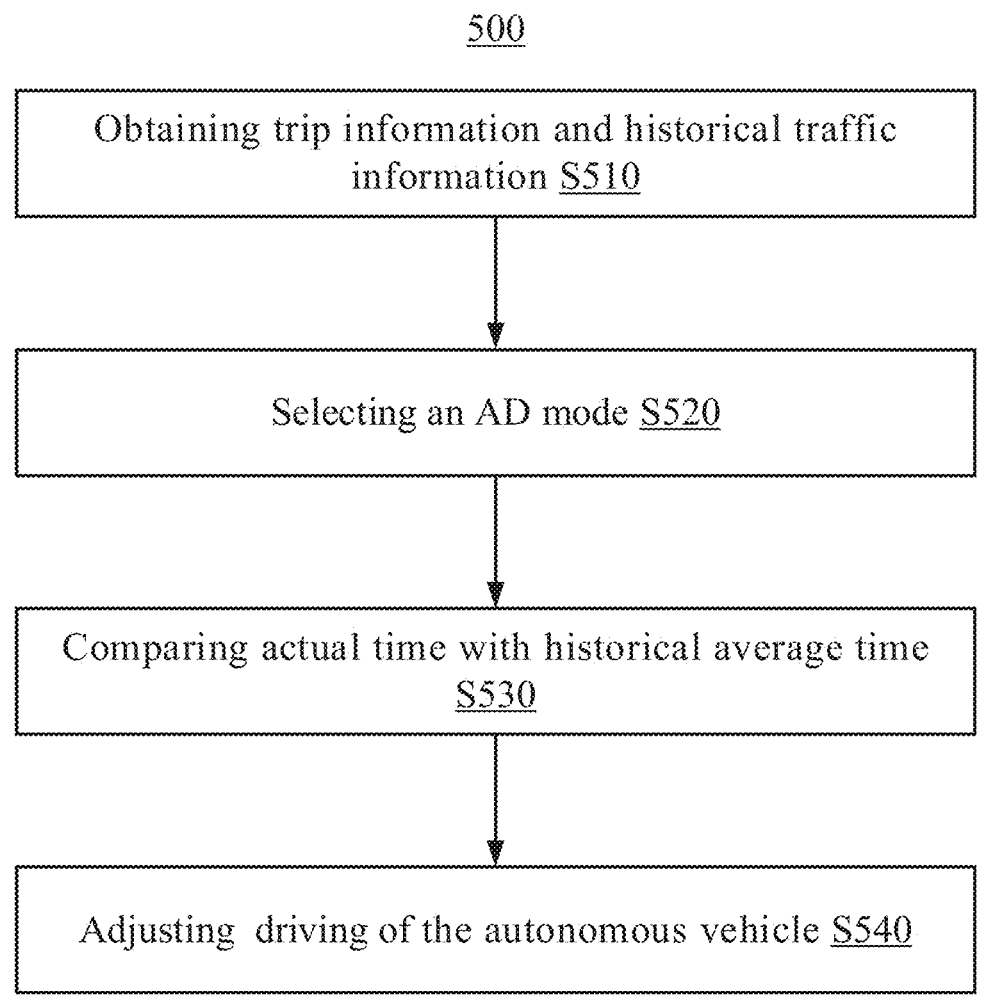
FIG. 5 is a flowchart of a control method for an autonomous vehicle according to an embodiment of the disclosure.

FIG. 5 shows a flowchart of a method 500 for controlling an autonomous vehicle according to an embodiment of the present disclosure. The method 500 can be executed by the AD control unit 40. Therefore, the above descriptions about the AD control unit 40 are also applicable here.

Referring to FIG. 5, in step S510, trip information of a current trip of a user of the autonomous vehicle and historical traffic information related to the current trip is obtained.

In step S520, an autonomous driving (AD) mode that is suitable for the current trip is selected from a plurality of pre-defined AD modes.

In step S530, time required for the autonomous vehicle to complete a portion of the current trip in the selected AD mode is compared with historical average time to complete the portion of the current trip. The historical average time is acquired based on the historical traffic information.

In step S540, driving of the autonomous vehicle is dynamically adjusted based on the comparison to minimize the difference between the time required for the autonomous vehicle to complete the portion of the current trip in the selected AD mode and the historical average time.

The disclosure provides a non-transitory computer-readable medium with instructions stored therein which, when executed, causes a processor to carry out the steps of the method 500 described above.

It is noted that all the operations in the method described above are merely exemplary, and the disclosure is not limited to any operations in the method or sequence orders of these operations, and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), a state machine, a gate logic, a discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be interpreted broadly to represent instructions, instruction sets, code, code segments, program code, programs, subroutines, software modules, applications, software applications, software packages, routines, subroutines, objects, running threads, processes, functions, and the like. Software can reside on a non-transitory computer-readable medium. Such non-transitory computer-readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to implement the various aspects described herein. Various modifications to these aspects will be readily apparent to those skilled in the art, and the general principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

What is claimed is:

1. A method for controlling an autonomous vehicle, the method comprising:
    obtaining trip information of a current trip of a user of the autonomous vehicle and historical traffic information related to the current trip;
    selecting an autonomous driving (AD) mode that is suitable for the current trip from a plurality of pre-defined AD modes comprising a time priority mode, a comfort priority mode, a commute mode, and an economy mode, wherein each of the plurality of pre-defined AD modes comprises a combination of logical limitations comprising an overtaking logic, a lane-changing logic, a speed logic, and an acceleration logic, wherein the overtaking logic comprises an overtaking success rate threshold expressed as a percentage of overtaking success and the lane-changing logic comprises a lane-changing success rate threshold expressed as a percentage of lane changing success;
    comparing a time required for the autonomous vehicle to complete a portion of the current trip in the selected AD mode with historical average time to complete the portion of the current trip, the historical average time being acquired based on the historical traffic information;

dynamically adjusting, based on the comparing, driving of the autonomous vehicle to be relatively more aggressive or relatively more moderate with respect to the combination of the logical limitations comprising the overtaking logic, the lane-changing logic, the speed logic, and the acceleration logic by adjusting one or more threshold parameters within the overtaking logic, the lane-changing logic, the speed logic, and the acceleration logic to minimize the difference between the time required for the autonomous vehicle to complete the portion of the current trip in the selected AD mode and the historical average time; and recommending, by the overtaking logic and when the commute mode is selected, overtaking when the time required for the autonomous vehicle to complete the portion of the current trip is greater than the historical average time to complete the portion of the current trip.

2. The method of claim 1, wherein
the percentage of the overtaking success rate threshold is based on overtaking space, relative vehicle speed, configuration of a road, ambient environment, and traffic condition;
the percentage of the lane-changing success rate threshold is based on lane-changing space and relative vehicle speed;
the speed logic comprises a speed limit of a road on which the autonomous vehicle is travelling; and
the acceleration logic comprises an acceleration threshold, the acceleration threshold comprising a safety threshold and a comfort threshold.

3. The method of claim 1, wherein each of the overtaking logic, the lane-changing logic, the speed logic, and the acceleration logic is extensible and adjustable.

4. The method of claim 2, wherein the acceleration logic recommends an acceleration that exceeds the comfort threshold but does not exceed the safety threshold in the time priority mode and the acceleration logic recommends an acceleration that does not exceed the comfort threshold in both the comfort priority mode and the commute mode.

5. The method of claim 2, wherein dynamically adjusting the driving of the autonomous vehicle comprises:
adjusting one or more of the overtaking success rate threshold, the lane-changing success rate threshold, the speed limit, the safety threshold, and the comfort threshold to make the driving of the autonomous vehicle relatively more aggressive or relatively more moderate.

6. The method of claim 2, wherein dynamically adjusting the driving of the autonomous vehicle to make the driving of the autonomous vehicle relatively more aggressive comprises:
recommending overtaking when an overtaking success rate under a current traffic condition is greater than the overtaking success rate threshold; and
recommending an acceleration that exceeds the comfort threshold but does not exceed the safety threshold.

7. The method of claim 2, wherein dynamically adjusting the driving of the autonomous vehicle to make the driving of the autonomous vehicle relatively more aggressive comprises:
recommending lane changing when a lane-changing success rate under a current traffic condition is greater than the lane-changing success rate threshold; and
recommending an acceleration that exceeds the comfort threshold but does not exceed the safety threshold.

8. The method of claim 2, wherein dynamically adjusting the driving of the autonomous vehicle to make the driving of the autonomous vehicle relatively more aggressive comprises:
adjusting by a minimum adjustment unit based on a request from the user or a physiological condition of the user, the minimum adjustment unit comprising a minimum adjustment unit for each of the overtaking success rate threshold, the lane-changing success rate threshold, the speed limit, the safety threshold, and the comfort threshold.

9. An autonomous vehicle, comprising:
a human-machine interaction interface (HMI) configured to receive trip information of a current trip of a user of the autonomous vehicle;
a communication unit configured to receive historical traffic information related to the current trip; and
an autonomous driving (AD) control unit comprising:
an obtaining module configured to obtain the trip information and the historical traffic information;
a determining module configured to select an autonomous driving (AD) mode that is suitable for the current trip from a plurality of pre-defined AD modes comprising a time priority mode, a comfort priority mode, a commute mode, and an economy mode, wherein each of the plurality of pre-defined AD modes comprises a combination of logical limitations comprising an overtaking logic, a lane-changing logic, a speed logic, and an acceleration logic, wherein the overtaking logic comprises an overtaking success rate threshold expressed as a percentage of overtaking success and the lane-changing logic comprises a lane-changing success rate threshold expressed as a percentage of lane changing success;
a comparing module configured to compare a time required for the autonomous vehicle to complete a portion of the current trip in the selected AD mode with historical average time taken to complete the portion of the current trip, the historical average time being acquired based on the historical traffic information; and
an adjusting module configured to dynamically adjust, based on the comparing, driving of the autonomous vehicle to be relatively more aggressive or relatively more moderate with respect to the combination of the logical limitations comprising the overtaking logic, the lane-changing logic, the speed logic, and the acceleration logic by adjusting one or more threshold parameters within the overtaking logic, the lane-changing logic, the speed logic, and the acceleration logic to minimize the difference between the time required for the autonomous vehicle to complete the portion of the current trip in the selected AD mode and the historical average time;
wherein, when the commute mode is selected, the overtaking logic is configured for recommending and overtaking when the time required for the autonomous vehicle to complete the portion of the current trip is greater than the historical average time to complete the portion of the current trip.

10. The autonomous vehicle of claim 9, further comprising a sensing unit configured to collect information on environment status, vehicle status, and user status, wherein the adjusting module is further configured to dynamically adjust driving of the autonomous vehicle according to the collected information.

11. The autonomous vehicle of claim 9, wherein
the percentage of the overtaking success rate threshold is based on overtaking space, relative vehicle speed, configuration of a road, ambient environment, and traffic condition;
the percentage of the lane-changing success rate threshold is based on lane-changing space and relative vehicle speed;
the speed logic comprises a speed limit of a road on which the autonomous vehicle is travelling; and
the acceleration logic comprises an acceleration threshold, the acceleration threshold comprising a safety threshold and a comfort threshold.

12. The autonomous vehicle of claim 9, wherein each of the overtaking logic, the lane-changing logic, the speed logic, or the acceleration logic is extensible and adjustable.

13. The method of claim 1, wherein the acceleration logic comprises an acceleration safety threshold and an acceleration comfort threshold, and wherein the acceleration logic recommends, when in the economy mode and in response to an emergency situation, an acceleration higher than the acceleration comfort threshold and lower than acceleration safety threshold.

14. The method of claim 1, wherein the overtaking logic recommends, in response to an emergency situation, overtaking even if the overtaking success rate threshold is not met.

15. The method of claim 1, wherein the lane-changing recommends, in response to an emergency situation, lane changing even if the lane-changing success rate threshold is not met.

16. The method of claim 1, wherein the acceleration logic comprises an acceleration safety threshold and an acceleration comfort threshold, and wherein, in the commute mode, the method further includes:
recommending, by the acceleration logic and when the commute mode is selected, an acceleration greater than the acceleration comfort threshold and less than the acceleration safety threshold when the time required for the autonomous vehicle to complete the portion of the current trip is greater than the historical average time to complete the portion of the current trip.

17. A method for controlling an autonomous vehicle, the method comprising:
obtaining trip information of a current trip of a user of the autonomous vehicle and historical traffic information related to the current trip;
selecting an autonomous driving (AD) mode that is suitable for the current trip from a plurality of pre-defined AD modes comprising a time priority mode, a comfort priority mode, a commute mode, and an economy mode, wherein each of the plurality of pre-defined AD modes comprises a combination of logical limitations comprising an overtaking logic, a lane-changing logic, a speed logic, and an acceleration logic, wherein the overtaking logic comprises an overtaking success rate threshold expressed as a percentage of overtaking success and the lane-changing logic comprises a lane-changing success rate threshold expressed as a percentage of lane changing success;
comparing a time required for the autonomous vehicle to complete a portion of the current trip in the selected AD mode with historical average time to complete the portion of the current trip, the historical average time being acquired based on the historical traffic information; and
dynamically adjusting, based on the comparing, driving of the autonomous vehicle to be relatively more aggressive or relatively more moderate with respect to the combination of the logical limitations comprising the overtaking logic, the lane-changing logic, the speed logic, and the acceleration logic by adjusting one or more threshold parameters within the overtaking logic, the lane-changing logic, the speed logic, and the acceleration logic to minimize the difference between the time required for the autonomous vehicle to complete the portion of the current trip in the selected AD mode and the historical average time;
wherein the acceleration logic comprises an acceleration safety threshold and an acceleration comfort threshold, and wherein, in the commute mode, the method further comprises:
recommending, by the acceleration logic and when the commute mode is selected, an acceleration greater than the acceleration comfort threshold and less than the acceleration safety threshold when the time required for the autonomous vehicle to complete the portion of the current trip is greater than the historical average time to complete the portion of the current trip.

* * * * *